March 5, 1968 R. J. NOSCHESE ET AL 3,372,308

INTERCONNECTING FRAME ASSEMBLY WITH IMPROVED CONNECTOR STRUCTURE

Filed Aug. 26, 1965 4 Sheets-Sheet 1

INVENTORS
RJ NOSCHESE J.C. SARAZEN
BY & N C. WILLIAMS
Howard A Reiter

March 5, 1968 R. J. NOSCHESE ETAL 3,372,308

INTERCONNECTING FRAME ASSEMBLY WITH IMPROVED CONNECTOR STRUCTURE

Filed Aug. 26, 1965 4 Sheets-Sheet 2

INVENTOR.
R.J. NOSCHESE J.C. SARAZEN
BY N.C. WILLIAMS

March 5, 1968 R. J. NOSCHESE ET AL 3,372,308

INTERCONNECTING FRAME ASSEMBLY WITH IMPROVED CONNECTOR STRUCTURE

Filed Aug. 26, 1965 4 Sheets-Sheet 3

INVENTOR.
R. J. NOSCHESE J. C. SARAZEN
N. C. WILLIAMS
BY Howard S Reiter

INVENTOR.
R.J. NOSCHESE J.C. SARAZEN
BY N.C. WILLIAMS
Howard S Reiter

United States Patent Office 3,372,308
Patented Mar. 5, 1968

3,372,308

INTERCONNECTING FRAME ASSEMBLY WITH IMPROVED CONNECTOR STRUCTURE

Rocco J. Noschese, Rowayton, Conn., John C. Sarazen, Mansfield, Mass., and Nathaniel C. Williams, New Brunswick, N.J., assignors to Burndy Corporation, a corporation of New York Filed Aug. 26, 1965, Ser. No. 482,806
8 Claims. (Cl. 317—101)

ABSTRACT OF THE DISCLOSURE

The electronic circuit assemblies are formed of a plurality of modular units, and a unique assembly of interconnecting frame elements which individually support separate circuit arrays.

This invention relates generally to electronic circuit assemblies formed of a plurality of modular subunits, and more particularly concerns a unique assembly of separable, interconnecting frame elements which individually support separate circuit arrays.

Magnetic core matrices and similar circuits, which require support of a plurality of conductors in a substantially planar array and interconnection of a plurality of such arrays into a larger stacked assembly, are currently widely used in electronic apparatus.

One well known form of such an assembly utilizes an open-centered rectangular printed circuit board frame, which has a plurality of dumbbell-shaped conductive pads formed around its periphery. A hole formed in one end of each dumbbell serves as a termination point for wire conductors supported across the center opening, while a hole in the other end serves as a solder securing point for external conductors and/or support elements. The latter conductors and/or elements serve to couple any given frame to others in a stacked assembly. Interframe connections in assemblies of this sort are generally formed by individually soldering conductors to the desired termination pads on the frames which form the assembly stack.

Stacked assemblies of frame units constructed in this manner are difficult and costly to produce. Due to the reliance on solder joints, it is generally not possible to adequately check out the circuitry of a complete assembly prior to final connection. Maintenance or repair of the finally completed assembly are as a result, extremely difficult, and damage to the circuitry of any one of the printed or etched circuit pads may require scrapping of an entire frame unit, or of the completed assembly.

Accordingly, it is an object of this invention to provide a stacked frame assembly which may be inexpensively repaired and tested, and which permits ready replacement of individual interconnecting parts.

Still another object is the provision of an assembly of the type described which is further adapted to have auxiliary circuit modules mechanically and electrically mounted thereto in quickly and conveniently removable fashion.

A feature of this invention is the provision of a plurality of interconnecting contact elements mounted on a dielectric frame member wherein the contact elements are positioned to anchor conductors associated with the frame and to electrically mate with corresponding contact members on similar frames placed in stacked relationship therewith.

A further feature of this invention is the provision of removable electrical jumper strips for selectively interconnecting contact elements and conductors of a plurality of frame members within a given stacked assembly.

These and other objects, features and advantages of this invention will be made more apparent by reference to the following specifications and claims, taken in conjunction with the accompanying drawings in which:

Figures 1, 2:
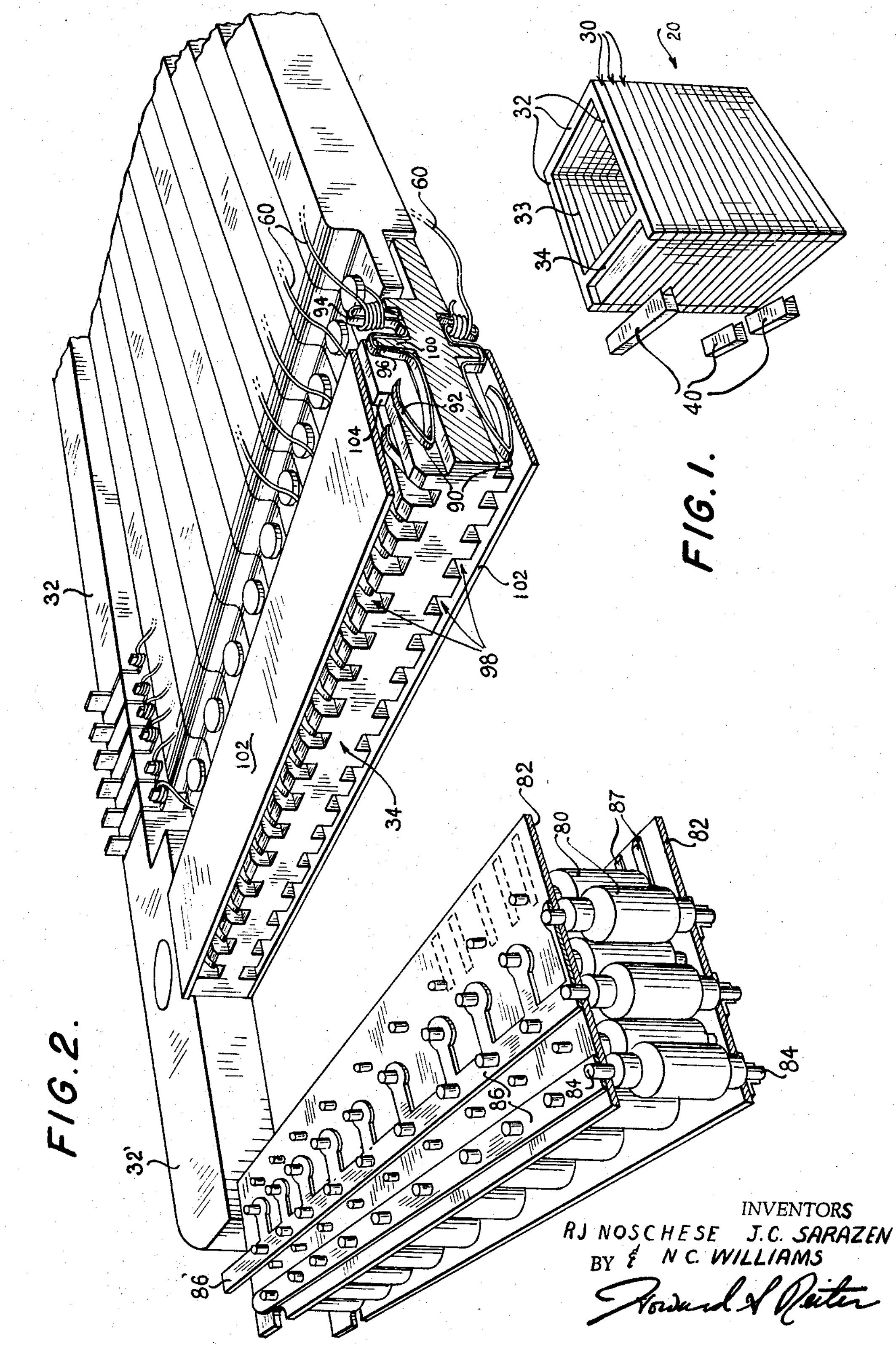
FIG. 1 is a representative pictorial view of the overall appearance of a stacked frame assembly constructed in accordance with this invention.
FIG. 2 is a partially cutaway pictorial view of a module-coupling portion of a frame member constructed in accordance with this invention, showing a component module in exploded position.

Referring now more particularly to the drawings, the overall assembly 20 shown in FIG. 1 may be seen to comprise a plurality of individual frame members 30 disposed in stacked, face-to-face relationship. Each frame member includes a plurality of side rails 32, which will be more particularly described below, and a module-receiving portion 34. Rails 32 and portion 34 together form a frame structure outlining a central opening 33. The component-carrying modules 40 which are engaged by the receiving portion 34 will likewise be more particularly described in the following.

Figure 6:
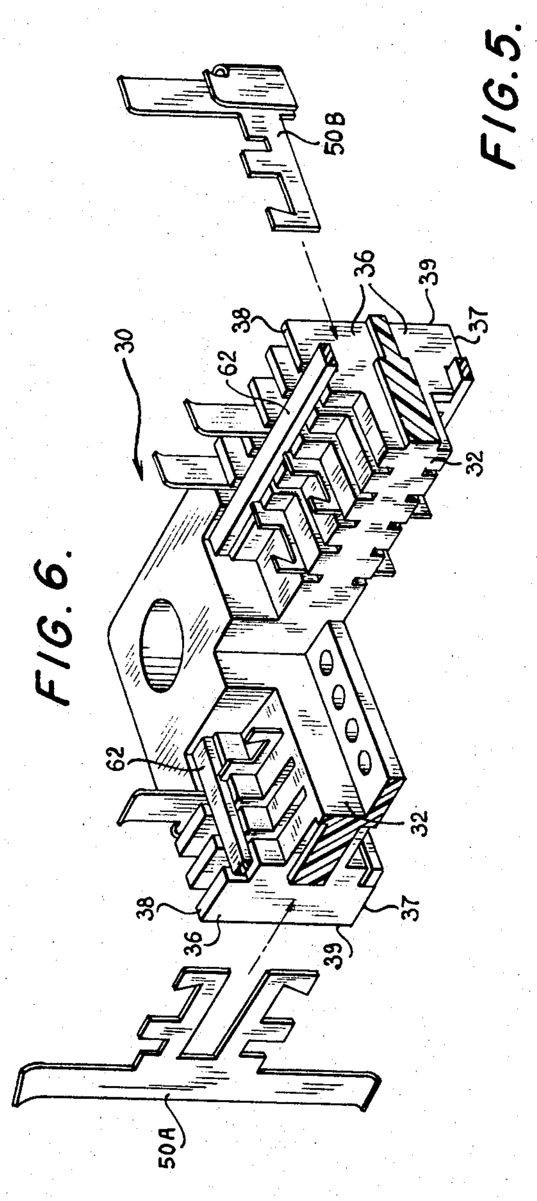
FIG. 6 is a partial cutaway pictorial detail view of a corner section of a frame member showing two different contact members in assembled and exploded positions.

FIG. 6 shows in detail a corner portion of one of the frame members 30 at the junction of two side rails 32. The side rails may be seen to include a plurality of slots or contact member-receiving positions 36 which open into the opposed faces 37, 38 and outer edge 39 of each rail. In the embodiment illustrated in FIG. 6, the receiving or seating positions 36 are particularly shaped to receive the contact members 50A and/or 50B, but it should be apparent that the shape of such slots may be selected to accept and position any contact member such as the others illustrated in the drawings. The contacts, which are thus provided with access openings in both of the opposed faces 37 and 38 of each side rail are shaped to contact corresponding contacts on adjacent stacked frame members. Contact is achieved in what is commonly referred to as hermaphroditic form by longitudinally projecting tabs on the individual contacts.

Figure 3:
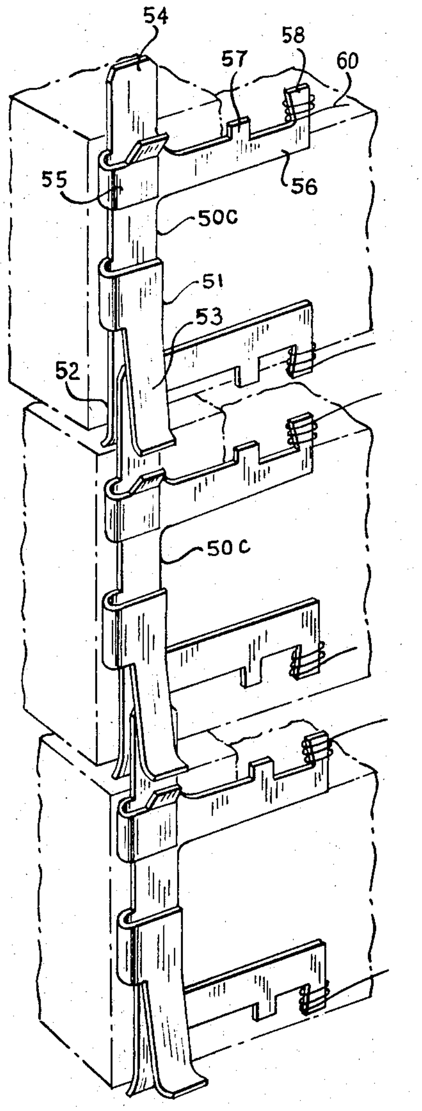
FIG. 3 is a partial pictorial view of one form of contact member used in invention, showing schematically the position of the contact in the side rail of a frame member.
Figure 4:
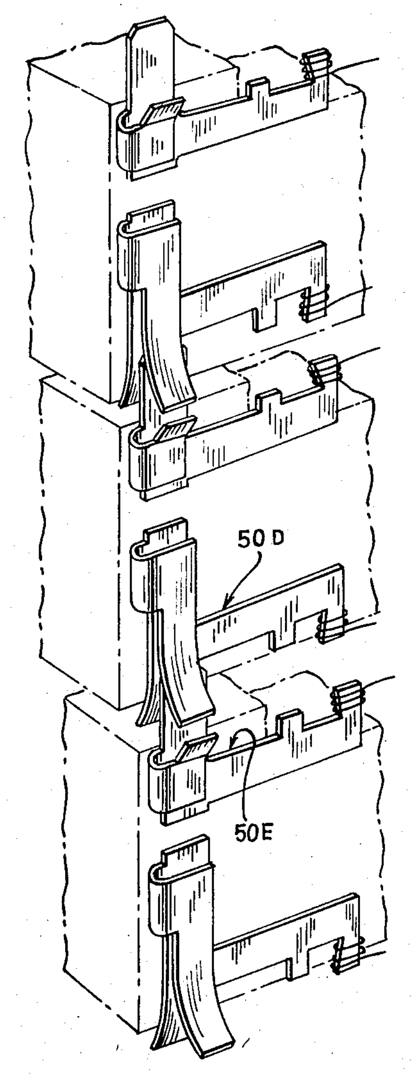
FIG. 4 is a partial pictorial view, as in FIG. 3, of another form of contact member used in this invention.

FIGS. 3 and 4 specifically illustrate the mating of contact embodiments 50C, D and E in a stack assembly of frame members, which may also include 50A and 50B. Contacts 50C shown in FIG. 3 may be characterized as "double feed through" contacts in that each includes both a plug and a receptacle portion. Each contact 50C may thus be seen to include a receptacle portion 51 having opposed resilient wiper arms 52 and 53, and an oppositely extending tongue portion 54 which is adapted to be inserted into the receptacle portion of a mating contact to establish an electrical connection. Contacts 50D and 50E on the other hand each comprise merely a receptacle or a plug, so that "feed through" of an electrical potential from contacts on opposite sides of a given frame is not accomplished as it is in the case of feed through contact 50C. These separate contacts may be readily seen to be formed of two opposite half sections of contact 50C; they may be conveniently obtained in practice by cutting a given contact 50C in two and removing a small intermediate portion to assure adequate spacing separation between the two when they are positioned in a frame as shown in FIG. 4.

A folded-over tab element 55 may be provided on the main body of the contact, in the case of 50C to act as a reinforcing and positioning element, and as a balance for the thickness created by wiper arms 52 and 53. On all of the contacts thus far described, integral terminal-connecting arm 56, extending from the body of the contact, may be formed and provided with projecting terminal tab 58 which serves as a connection point for electrically connecting external conductors 60 to the contacts. The connections thus made may be secured in any convenient well known manner as by merely wrapping the conductor tightly around the tab, or by wrapping and soldering.

In addition to terminal tab 58, terminal arm 56 may be further provided with a locking tab 57 for retaining the contact within its position. Tabs 57 may be resiliently biased or deliberately bent out of the plane of arm 56 to engage the surface of the side rail immediately adjacent the edge of the contact receiving slot in which the contact is placed. The contacts are thus retained within the receiving slots through the interaction of tabs 57 and an abutting surface on each given side rail. Alternatively, as may be seen most clearly in FIG. 6 in the case of contacts 50A and 50B, the slots 36 may be completely open on three sides and a retaining bar 62 may be provided for partially closing one side after the contacts have been positioned in the receiving slots. For final assembly the bar 62 may be secured in proper position on the side rail by means of a suitable glue or other appropriate fastening device.

Figure 9:
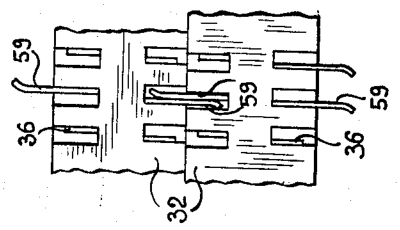
FIG. 9 is an edge-on view showing the manner in which the contact members of FIG. 8 are mated.
Figure 8:
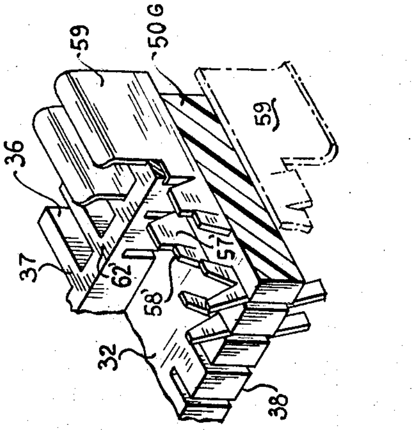
FIG. 8 is a pictorial detail view of a form of hermaphroditic contact member which may be used in this invention, showing it in seated position in a frame member portion 1.

FIGS. 8 and 9 illustrate still another contact embodiment adapted to function in accordance with this invention. In this embodiment the slots 36 in side rails 32 are fully open on only two sides; i.e. each slot extends through from outer face 39 to the inner surface of each rail with an integral partial obstruction 62 being formed in surfaces 37 and 38 of the rail. This obstruction prevents inadvertent removal of the contacts 50G. Again, each contact is provided with an integral terminal tab 58' for connecting to external conductors, and a locking tab 57' for engaging a surface of any given rail in the manner previously described.

Each of contacts 50G includes a pair of substantially identical, oppositely extending wiper-type contact blades 59. The blades are in turn each slightly bowed in opposite directions to facilitate mating with the correspondingly opposite blade of the related contact in an adjacent rail as shown in FIG. 9. FIG. 9 further illustrates the manner in which the hermaphroditic blades 59 engage within the appropriately sized portions of receiving slots 36 so that the mates contacts are substantially enclosed within the side rail.

Figure 5:
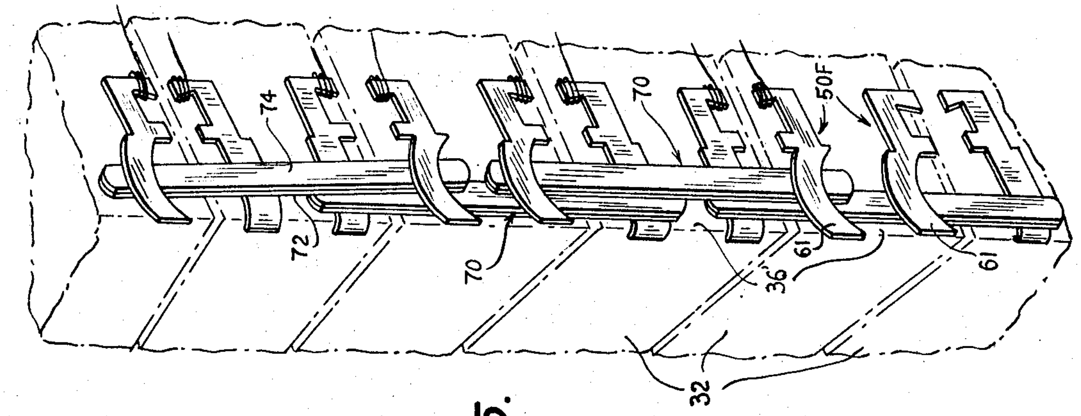
FIG. 5 is again a partial pictorial view of still another form of contact member and interconnecting jumper strip used in this invention.

Referring now to FIG. 5, a novel system is shown for selectively interconnecting certain contacts 50F on non-adjoining frame side rails 32 of an assembly formed in accordance with this invention. This system may be seen to employ one or more removable jumper strips 70 which are formed of a dielectric base material 72 having a conductive strip or coating 74 secured thereto. Contacts 50F are provided with transverse wiper contact arms 61 which engage the conductive surfaces 74 of strips 70. Thus, with contacts 50F seated in receiving slots 36' which define a continuous channel for receiving the strips 70, a simple and effective means for interconnecting two or more adjacent or non-adjacent frames within a given stack assembly is provided; any desired combination of interconnections may be achieved by controlling the length of, or selectively positioning exposed conductive surfaces on, the strips 70, together with selective placement and/or omission of certain of contacts 50F. To break or rearrange the connections thus made it is simply necessary to remove the appropriate jumper strip.

The contact elements and associates interconnection described thus far have related primarily to the electrical coupling of the various frame layers within a given stack assembly. In frame devices of the type thus described, however, it is also occasionally necessary to couple certain circuit components such as diodes, capacitors, resistors, etc. directly to a given frame. Couplings of this type may be accomplished in accordance with this invention by means of the component carrying modules 40 and module receiving frame portions 34.

Modules 40 may be seen to comprise, in the illustrated embodiment, a plurality of circuit components 80 which are captured between a pair of board elements 82. The conductive leads 84 which extend from oppoiste ends of the components 80 are coupled in well known fashion to the "printed" circuit conductors 86, 87 carried on the surfaces of the boards 82. In the embodiment illustrated in FIG. 2, circuit conductors 86 are shown being used as bus bars coupling a plurality of leads 84 in common; conductors 87 on the other hand are shown extending in parallel spaced apart relation, substantially perpendicular to the edge of the board. Individual leads 87 may thus form individual connections to one or more individual conductive leads 84.

To couple the circuit components 80 to wire conductors 60 which form the essential elements of the subject frames and assemblies, the module receiving frame portions 34 are provided with a plurality of contact elements 90 which are positioned to engage the circuit board leads 87. The contacts 90 include a surface contact spring portion 92, a wire conductor termination portion 94, and an intermediate retention and positioning portion 96.

The module receiving portion 34 may be seen to include a plurality of contact locating slots 98 in the form commonly used for commercial printed circuit connectors. Each slot may in turn be seen to include an intermediate retention rib 100 which is adapted to engage the contact retention portion 96 to lock a contact into position within the slot. Convenient and rapid assembly of contacts 90 to portion 34, is facilitated by covering the partially open slots 98 with cover plates 102 after the contacts have been placed in position. The upper edge of the wall structures between adjacent slots are cut away as at 104 so as to define a space beneath cover plates 102 suitable for receiving the edges of boards 82 in plug-in relationship.

It may now be seen that a simple and effective means has been provided for effectively connecting a plurality of individual components to the wires mounted on a particular frame. The plug-in mounting method thus provided readily permits removal of the modules 40 for exchange, replacement or repair. To further facilitate mounting and support of the assembled modules, extension arms 32' may be formed on side rails 32 or in some other satisfactory manner so as to project beyond frame portion 34 as shown. Boards 82 may then be extended at each end to straddle arms 32' and slide along them, during insertion of a module, in the manner of a drawer guide. In addition conductors 86 may be extended, if desired, as shown at 86' to facilitate the making of auxiliary or test connections or the like.

Figure 7:
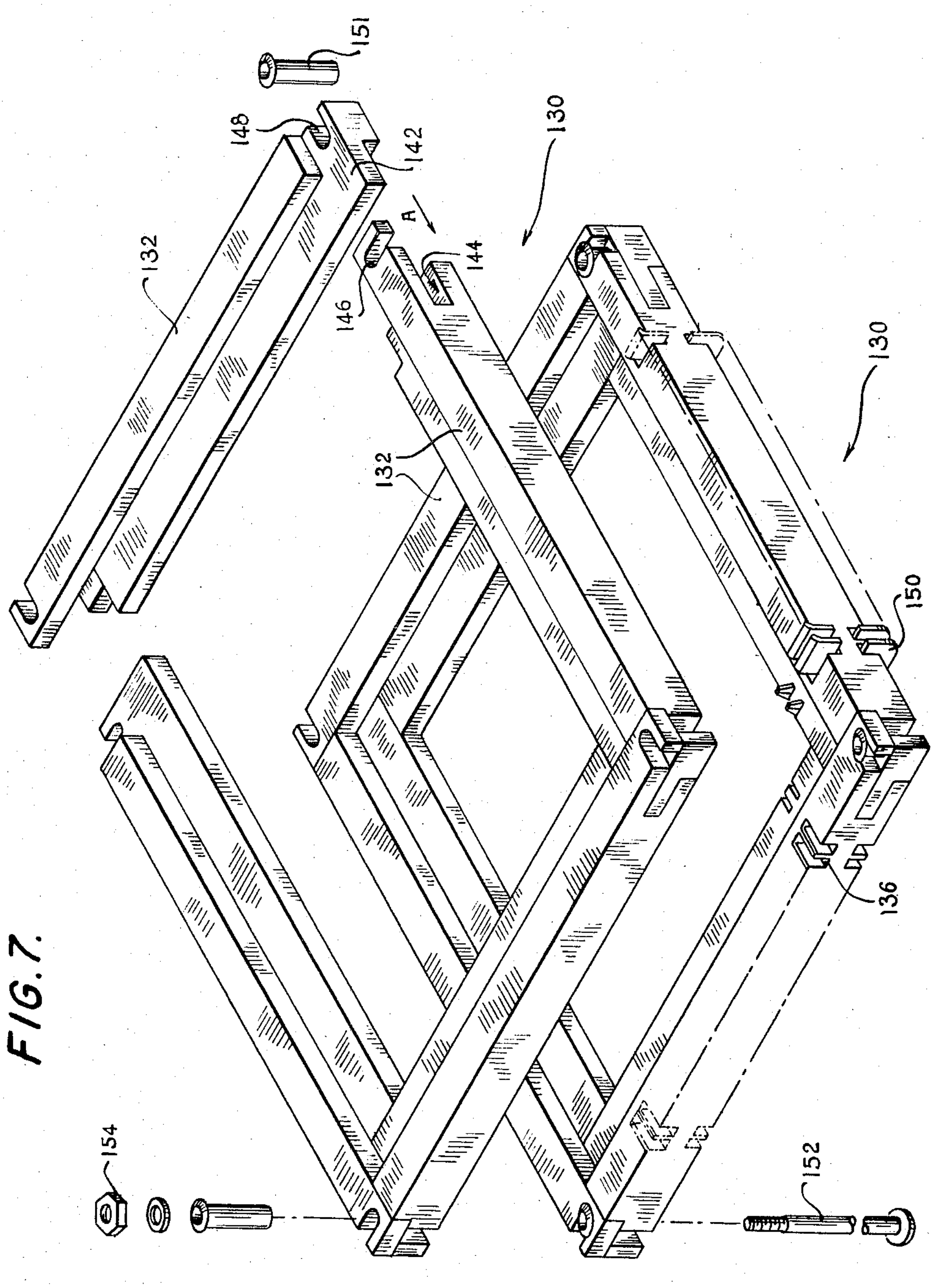
FIG. 7 is a partially exploded pictorial view of one form of frame member constructed of a plurality of individual side rails.

Although the frames illustrated in FIGURES 1, 2 and 6 appear to be for the most part integrally molded one-piece parts, other and alternative structures may be employed in accordance with this invention. FIG. 7 illustrates one additional embodiment in which the frames 130 are formed of a plurality of individual rail elements 132 which are provided with mating coupling going means at their respective ends. The joint means of the illustrated embodiment includes a web portion 142 and a web receiving slot 144 in a mating rail, which are adapted to be slidably engaged in the direction shown by arrow A in FIG. 7. Each rail also includes an aperture or slot 146, 148, adjacent the web 142 or slot 144. When the mating rails are assembled with web 142 within slot 144, apertures 146 and 148 are aligned in position to receive a retention element such as headed tube or rivet 151. Apertures 146, 148 may be formed as slots (as shown) to facilitate sliding disengagement of two mating rails or they may be formed as through holes for the purpose of locking a completed joint together until retention element 151 is removed. In any event, web and slot 142, 144 may be seen to firmly retain the relative alignment of two joined rails, while element 151 serves to substantially prevent separation of the joint. In the event it is desired to more securely lock the joint in assembled position a bolt 152 may be slipped through the tube 151 and tightened in position with a nut 154 to firmly clamp the assembled rails together.

Rails 132 may be seen to include contact receiving slots 136 with contacts 150 disposed therein in the manner previously discussed in this specification. Moreover, it is considered apparent that a frame portion similar to portion 34, previously discussed, may be provided with webs and slots and assembled to a rail 132 as set forth above.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

We claim:

1. A modular frame assembly for composite electrical circuit structures, comprising:

a plurality of substantially planar frame members disposed in stacked, face-to-face relationship, each having a pair of opposed faces and an outer edge;

each of said frame members including, a central opening adapted to receive an array of electrical conductors, and a plurality of side rails of dielectric material disposed about said opening;

at least one side rail in each of said frame members having a plurality of contact receiving positions therein;

a plurality of electrical contact members disposed in said receiving positions;

means on said contact members for coupling to conductors disposed within the opening of the corresponding frame member; and separable mating means on said contact members for electrically coupling contact members on a given frame member to corresponding contact members on other frame members in said assembly.

2. The frame assembly of claim 1 wherein said separable mating means for coupling corresponding contact members on different frame members within said assembly includes:

projecting plug portions on contact members in a given frame member, extending beyond one of the opposed faces of said frame member; and cooperating receptacle portions on contact members in an adjacent frame member for receiving said plug portions.

3. The frame-assembly of claim 2, further including:

a plurality of contact members each having a receptacle portion, for receiving the projecting plug portion of a corresponding contact on one adjoining frame member, and a projecting plug portion, for mating with the corresponding contact member on another adjoining frame member.

4. The frame-assembly of claim 1 further including releaseable interlocking means on said contact members and said frame member side rails for retaining said contact members within said receiving positions.

5. The frame assembly of claim 1 wherein said separable mating means further includes:

a plurality of jumper bars each formed of an elongate dielectric base portion having a conductive surface portion thereon; and a plurality of conductive-surface-engaging elements coupled to said contact members and disposed adjacent the outer edge of a plurality of said frame members for electrically engaging the conductive surface of a jumper bar disposed transversely across the outer edges of said plurality of frame members.

6. The frame assembly of claim 5 wherein said jumper bars include separate conductive surface portions on two sides of said base portions, and certain of said conductive-surface-engaging elements are positioned to engage one of said conductive surface portions on one side of a jumper bar and others of said surface-engaging elements are positioned to engage the conductive surface portion on the other side of said jumper bar.

7. The frame assembly of claim 1 further including a module-receiving edge portion on one of said frame members:

a plurality of module-mating contact members mounted to said module-receiving edge portion in substantially parallel side by side relationship;

means on said contact members for coupling to conductors disposed within the opening in said one frame member; and a component-mounting adapted to be coupled to said module-receiving edge portion, comprising:

a base, a plurality of conductive surface contact elements mounted to said base in parallel side by side relationship for mating with said module-mating contact members when said module is coupled to said receiving edge portion, and an electrical component mounted to said base and electrically coupled to one or more of said contact elements.

8. The frame assembly of claim 6 wherein said module base and said contact elements comprise a printed circuit board and printed circuit conductors respectively, and said module-mating contact members on said module-receiving edge portion comprise resilient printed circuit contacts.

No references cited.

ROBERT S. MACON, *Primary Examiner.*

J. R. SCOTT, *Assistant Examiner.*